United States Patent [19]
Costin

[11] 4,054,318
[45] Oct. 18, 1977

[54] SEAT CUSHION MOUNTING ARRANGEMENT

[75] Inventor: Robert W. Costin, Troy, Mich.

[73] Assignee: Lear Siegler, Inc., Detroit, Mich.

[21] Appl. No.: 716,054

[22] Filed: Aug. 20, 1976

Related U.S. Application Data

[62] Division of Ser. No. 622,574, Oct. 15, 1975, Pat. No. 4,014,593, which is a division of Ser. No. 554,863, March 3, 1975, Pat. No. 3,954,245.

[51] Int. Cl.² .................... A47C 1/023; A47C 1/024
[52] U.S. Cl. ................................. 297/313; 248/393; 248/424; 297/337
[58] Field of Search ............ 297/311, 313, 325, 326, 297/337, 353, 354, 443, 444; 248/393–395, 424, 429; 292/204, 240, 241

[56] References Cited

U.S. PATENT DOCUMENTS

| 1,483,923 | 2/1924 | Arnold | 292/DIG. 46 X |
|---|---|---|---|
| 1,744,158 | 1/1930 | Carswell | 292/241 |
| 2,286,946 | 6/1942 | Ball | 248/424 |
| 2,646,839 | 7/1953 | Hillman | 297/313 |
| 3,144,270 | 8/1964 | Bilancia | 297/337 X |
| 3,511,533 | 5/1970 | Drabert | 297/337 |
| 3,784,147 | 1/1974 | Harder, Jr. | 297/337 X |

Primary Examiner—Roy D. Frazier
Assistant Examiner—William E. Lyddane
Attorney, Agent, or Firm—Reising, Ethington, Barnard, Perry and Brooks

[57] ABSTRACT

A seat cushion is mounted on the seat base for forward and rearward adjusting movement with respect to the seat back by a mounting arrangement having latch members that also latch the seat cushion to the seat base while permitting tilting movement of the seat cushion.

14 Claims, 9 Drawing Figures

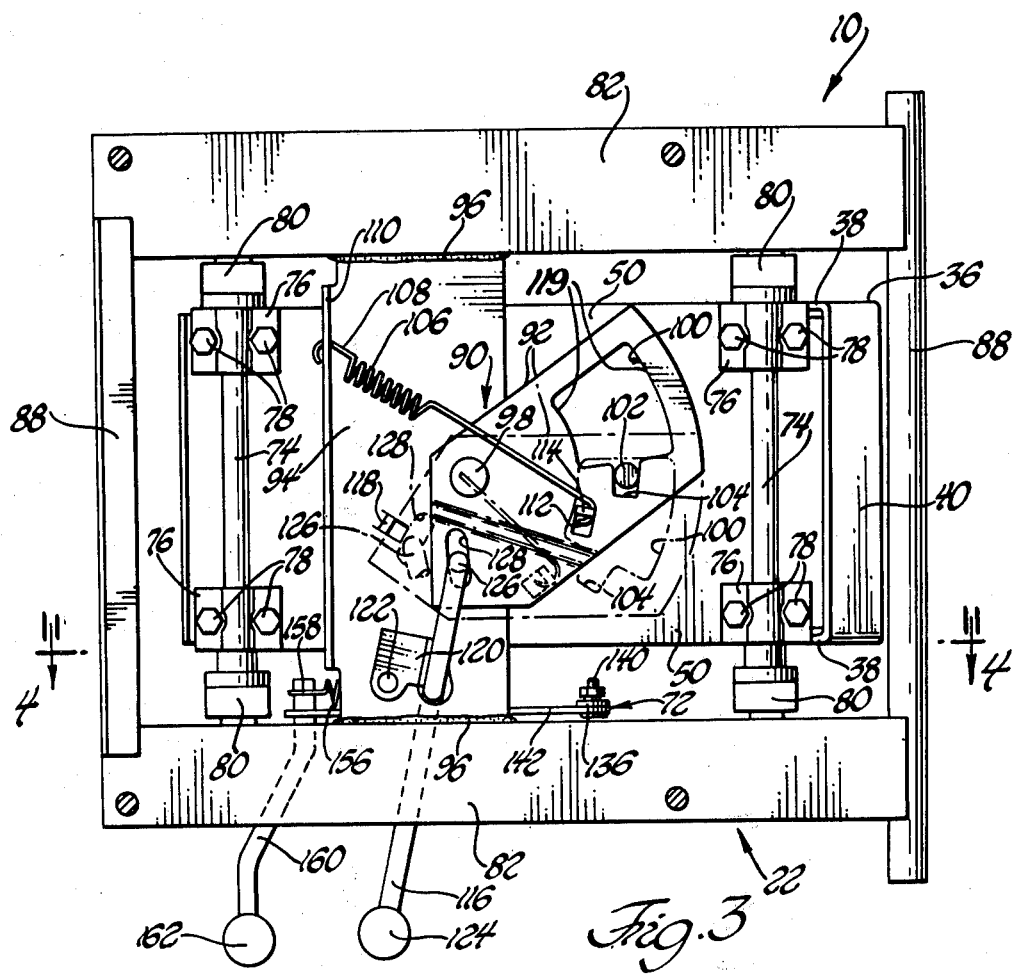

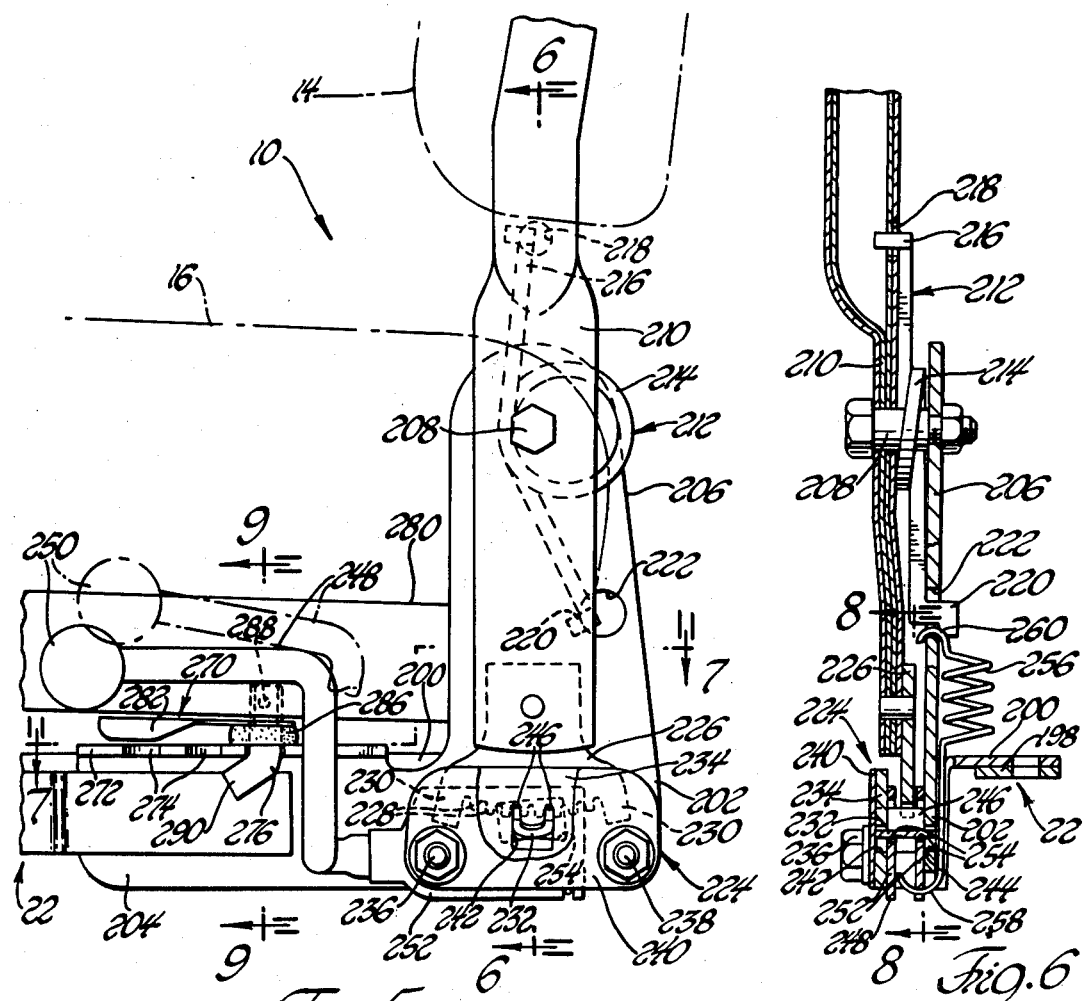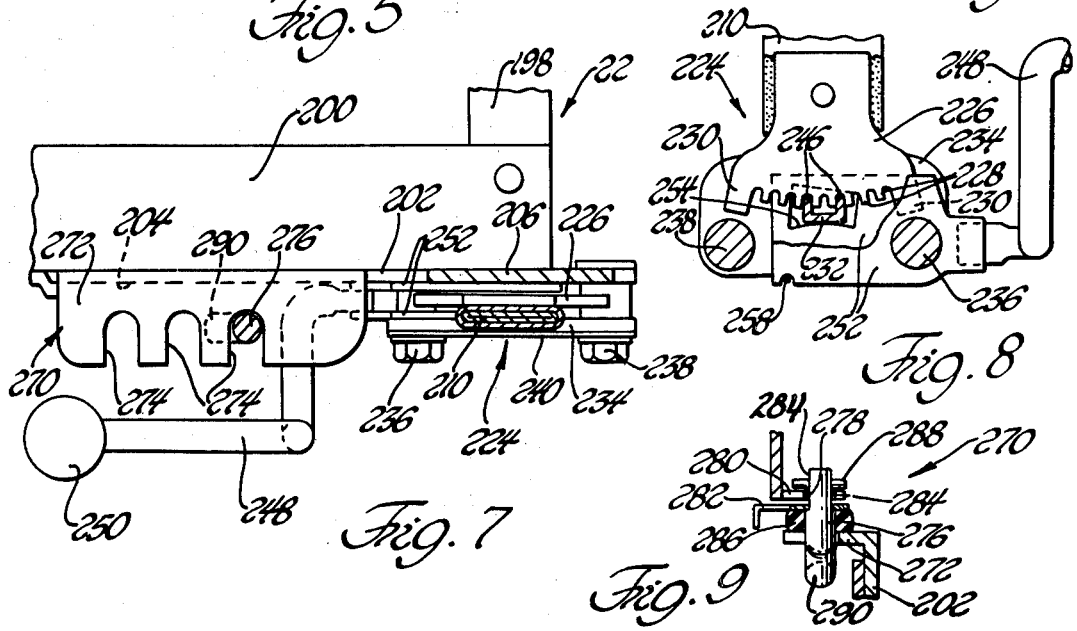

SEAT CUSHION MOUNTING ARRANGEMENT

This is a division, of application Ser. No. 622,574, filed Oct. 15, 1975, application Ser. No. 622,574 being a division of application Ser. No. 554,863, filed Mar. 3, 1975 and now U.S. Pat. No. 3,954,245.

BACKGROUND OF THE INVENTION

1. Field of the Invention

This invention relates to vehicle seats and to support assemblies for vehicle seats.

2. Description of the Prior Art

Prior vehicle seat support assemblies have included fluid springs that receive pressurized fluid so as to support the seat in a manner that isolates the seat occupant from vertical vehicle vibrations. The U.S. Pat. No. of Lowe, 3,661,176 discloses a time delay leveling valve whose operation supplies and exhausts fluid within a fluid spring to maintain the same vertical seat height regardless of the weight of the seat occupant. Time delay operation of the Lowe valve prevents the valve from transiently supplying and exhausting pressurized fluid within the fluid spring during abrupt vertical seat movement resulting from dynamic forces that act on the seat during vehicle operation. However, the vertical height at which the Lowe valve positions the seat is not adjustable, and relatively heavy seat occupants who are short waisted may find they are positioned at a lower vertical height than they desire. Likewise, relatively light, long waisted persons may find that they would be positioned at a higher position than they desire.

The U.S. Pat. No. of Radke et al 3,325,136 discloses a vehicle seat of the fluid spring type, and the level of pressurized fluid within the fluid spring thereof is adjustable to control the static or mean vertical seat position. The adjustment is provided by a valve which is controlled by a somewhat complex linkage that is either coupled or uncoupled with the valve by manual operation of the seat occupant. Coupling of the linkage to the valve permits the linkage to be adjusted to change the vertical height of the seat. However, the linkage must be uncoupled from the valve during normal vehicle operation to prevent the valve from transiently being actuated by the vertical seat movement resulting from dynamic vehicle forces.

Vehicle seats, whether of the fluid spring supported type or not, have heretofore included adjustable supports for the generally horizontal seat cushion on which the seat occupant sits as well as the generally vertical seat back against which the occupant leans. The U.S. Pat. No. of Hillman 2,646,839 discloses a vehicle seat whose cushion is longitudinally adjustable with respect to its seat back and also supported for vertical movement at both its forward and rearward ends to provide a desired tilted adjustment of the cushion. The U.S. Pat. No. of Harder, Jr. 3,784,174 discloses a seat having a seat cushion that is mounted for tilting movement with respect to its associated seat back but not for longitudinal adjusting movement. A bolt and compressible washer securement pivotally supports one end of the Harder seat cushion so as to permit vertical tilting movement of its other end.

Also, recliner mechanisms for controlling the vertical tilted position of vehicle seat backs and the backs of nonvehicle seats are shown by the following U.S. Pat. Nos.: Hogan 412,617; Hultgren 1,889,478; Norwood et al 2,809,691; Borisch Re. 24,528. Seat back recliner mechanisms function best if they are of a rugged and durable construction so as to provide a long lifetime of service.

SUMMARY OF THE INVENTION

An object of the present invention is to provide a vehicle seat support assembly wherein an upper seat base is supported by a fluid spring that receives and exhausts pressurized fluid under the control of a time delay valve which is actuated by a manually adjustable control linkage constantly coupled between the seat base and the valve, and the support assembly positions the seat base at a static vertical height corresponding to the adjusted position of the control linkage for seat occupants of any weight without actuating the valve during dynamic vertical seat base movement due to the time delay valve operation.

Another object of the invention is to provide a recliner mechanism for controlling the tilted position of a seat back component with respect to a seat cushion component, wherein the mechanism includes a pair of spaced support portions fixedly mounted with respect to one of the components and a keeper fixedly mounted with respect to the other component and received between the support portions so that a pawl slidably supported by the support portions engages the keeper and transfers forces to the support portions from the keeper in a balanced manner due to the positioning thereof an opposite sides of the keeper.

A further object of the invention is to provide an arrangement for mounting a seat cushion component on a seat base component in an adjustable manner with respect to an associated generally vertical seat back, wherein the mounting arrangement includes a pivotal latch member on one of the components that has a nonlatching position aligned with elongated openings in a keeper on the other component so that the latch member may be passed through one of the openings and then pivoted to a latching position unaligned with the opening in a manner that positions the seat cushion at a selected position with respect to the associated seat back.

In carrying out the above objects and other objects, a vehicle seat embodying the invention includes a support assembly having a lower floor base that mounts an upper seat base by a fluid spring and a plurality of support links that extend between the bases in parellelogram linkage arrangements so that pressurized fluid received by a chamber of the fluid spring raises and lowers the seat base while the support links rotate with respect to both bases. The time delay valve that controls the supply and exhaustion of pressurized fluid within the fluid spring is mounted on the floor base and connected to one end of an actuating link whose other end is connected to the lower end of a connecting link. The upper end of the connecting link is connected to one end of an adjustment link that is pivoted to the seat base in a first class lever manner by a pin-and-slot connection. The other end of the adjustment link has a handle that extends through an arcuate slot in the seat base, the slot being generated about the axis of the adjustment link rotation. A spring bias engages the handle of the adjustment link with the arcuate slot so as to provide a frictional engagement that rotationally positions the adjustment link with respect to the seat base. The actuating link actuates the valve in response to the vertical height of the seat base so as to either supply or exhaust pressurized fluid within the fluid spring. The fluid spring raises or lowers the static height of the seat base to correspond with the adjusted position of the control linkage for seat occupants of all weights. The time delay operation of the valve prevents dynamic vertical movement of the seat base during the vertical operation from transiently actuating the valve to supply and exhaust pressurized fluid within the fluid spring. The handle on the adjustment link is adjustable upwardly or downwardly to raise or lower the static height of the seat base.

The seat base of the seat also pivotally supports a seat back whose tilted position is controlled by the recliner mechanism which includes a pair of spaced support portions on the base and a toothed keeper on the seat back. The keeper on the seat back is received between the support portions on the base. U-shaped apertures in the support portions slidably receive the opposite ends of a pawl having a U-shaped cross-section, and the pawl is thereby mounted for vertical movement between latching and nonlatching positions with respect to the keeper teeth. An actuating member pivoted to the seat base includes spaced yoke portions received between the keeper and the support portions. The yoke portions are apertured to receive the pawl and control movement thereof. A spring bias of the actuating member causes the yoke portions to normally engage the pawl with the keeper teeth to prevent the tilting seat back movement. Manual rotation of the actuating member against the spring bias moves the pawl downwardly so that tilting seat back adjustment is permitted. The pawl includes a pair of spaced legs which are engaged between spaced pairs of teeth on the keeper in a manner that gives the mechanism a durable construction.

The upper seat base also supports a keeper of the adjustable mounting arrangement for the seat cushion. The keeper defines elongated openings that are spaced forwardly and rearwardly with respect to the seat and open in an outboard direction. Two such keepers are associated with the seat base on opposite sides of the seat. Each keeper is associated with a downwardly extending pivotal latch member on the adjacent side of the seat cushion. A handle moves each latch member between a nonlatching position where a latching portion thereof is aligned with the openings in the associated keeper to permit the latch member to move downwardly through one of the openings, and subsequent rotation of the latch member then moves the latching portion out of alignment with the opening to provide a latching securement of the seat cushion to the seat base. Each latch member includes a compressible washer that permits a tilt adjuster to change the tilted position of the cushion to provide occupant comfort.

Each keeper of the adjustable mounting arrangement for the seat cushion is formed integrally on one leg of an L-shaped support member of the base whose other leg pivotally mounts the seat back for its tilting movement. The juncture of the two legs of one of the support members provides one of the support portions that slidably mounts the pawl of the recliner mechanism.

BRIEF DESCRIPTION OF THE DRAWINGS

FIG. 3 is a plan view taken through the seat along line 3—3 of FIG. 1;

FIG. 4 is an elevation view taken along line 4—4 of FIG. 3;

FIG. 5 is a partially broken away enlarged view of a portion of FIG. 1;

FIG. 6 is a sectional view taken along line 6—6 of FIG. 5;

FIG. 7 is a partial sectional view looking downwardly approximately along line 7—7 of FIG. 5;

FIG. 8 is a view taken along line 8—8 of FIG. 6; and

FIG. 9 is a sectional view taken along line 9—9 of FIG. 6.

DETAILED DESCRIPTION OF THE PREFERRED EMBODIMENT

Figure 1:
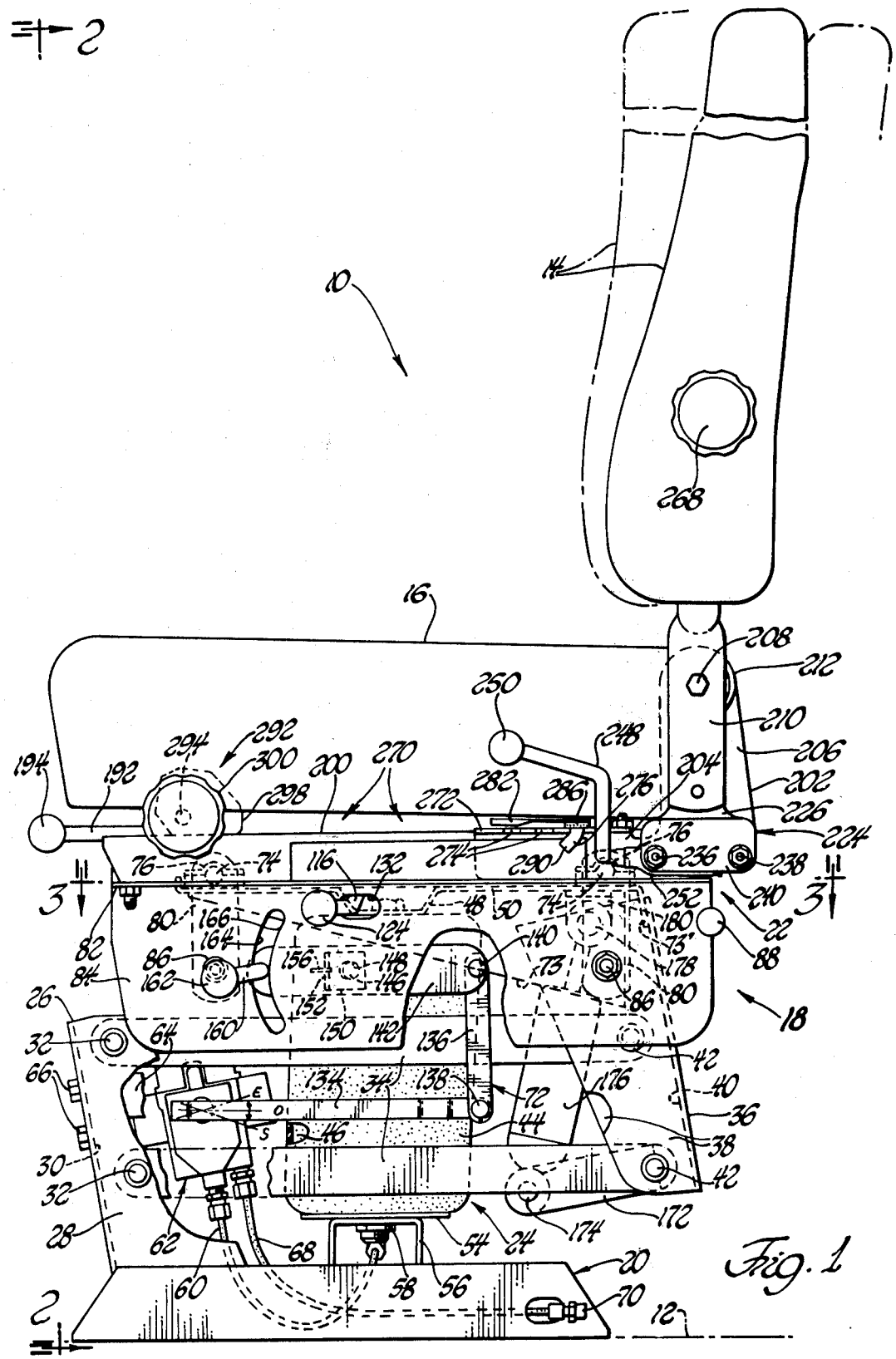
FIG. 1 is a partially broken away side elevation view of a vehicle seat embodying the present invention.

Referring to FIG. 1 of the drawings, a vehicle seat embodying the present invention is collectively indicated by reference numeral 10 and is mounted on a vehicle floor 12 shown by phantom lines. The seating components of seat 10 include an upright seat back 14 and a generally horizontal seat cushion 16. Seat back 14 and seat cushion 16 are mounted on the vehicle floor 12 by a support assembly 18. A lower floor base 20 of the support assembly is mounted on the floor 12 and secured in any suitable manner such as by threaded nuts and bolts. An upper base 22 of the support assembly mounts the seat back 14 and seat cushion 16 for adjusting movement in a manner that will be more fully hereinafter described. The support assembly 18 also includes a fluid support system 24 that adjustably positions the upper base 12 with respect to the lower base 20.

Figure 2:
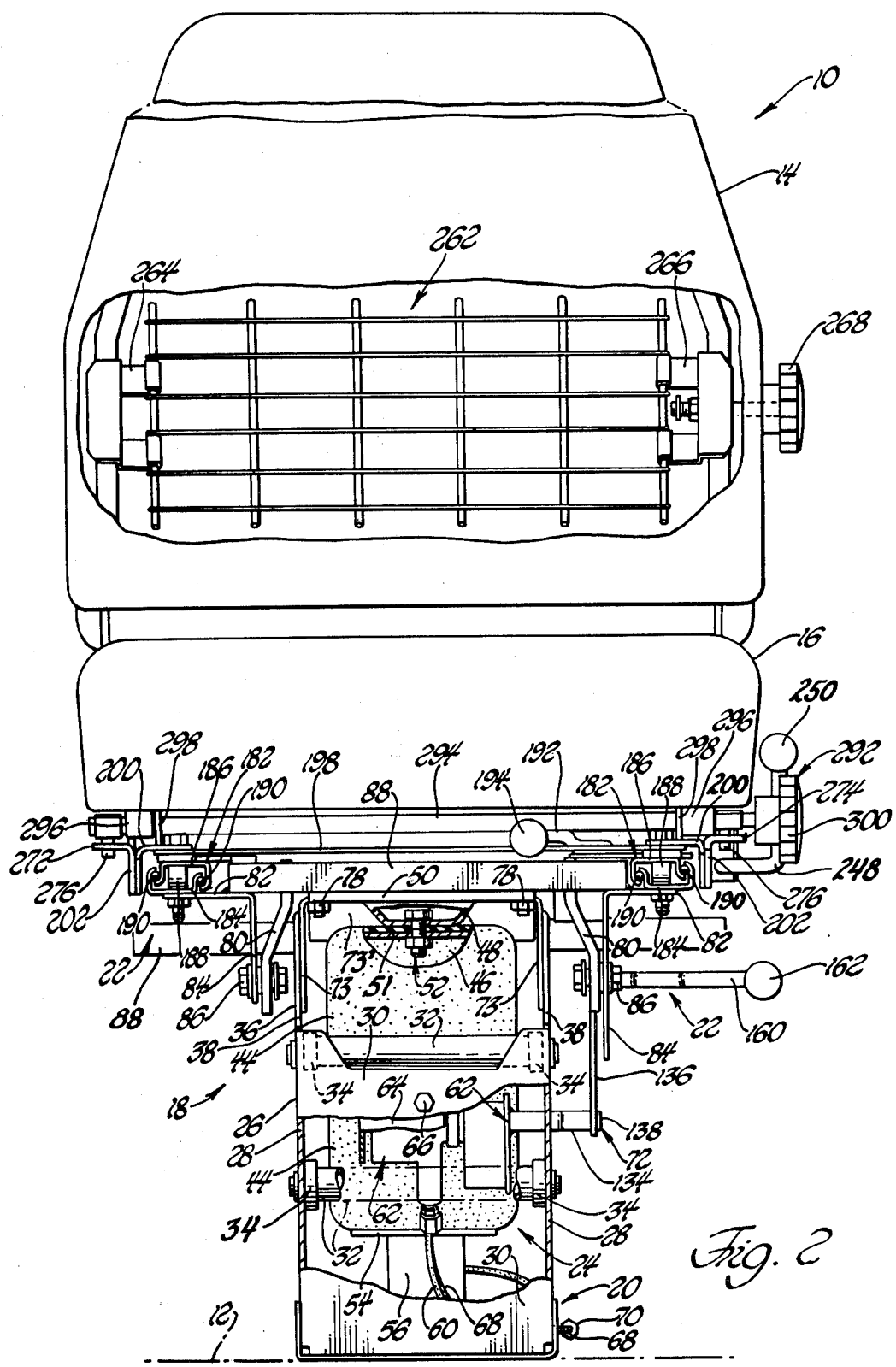
FIG. 2 is a partially broken away front elevation view of the seat taken along line 2—2 of FIG. 1.

As seen by reference to FIGS. 1 and 2, the forward end of the lower base 20 includes an upwardly extending portion 26 that has a pair of laterally spaced flanges 28 connected by a web 30. A pair of tubular pintle members 32 extend between the flanges 28 in a parallel relationship to web 30 and pivotally support the adjacent ends of two pairs of upper and lower links 34 that have elongated configurations. As seen in FIG. 1, the upper base 22 includes a downwardly depending portion 36 that has laterally spaced flanges 38 connected by a web 40 in a manner similar to the upwardly extending portion 26 of the lower base. Pintle members 42 extend between the flanges 38 and pivotally support the adjacent ends of the two pairs of upper and lower links 34. Links 34 thus mount the upper base 22 on the lower base 20 in a parallelogram linkage fashion so as to guide the upper base during vertical movement with respect to the lower base.

With reference to FIGS. 1 and 2, a fluid spring 44 of fluid support system 24 takes the form of a rubber bellows that defines a chamber 46 for receiving pressurized fluid. The upper end of flanges 44 is engaged with a downwardly depending depression 48 in a sub-base 50 of upper base 22. As seen in FIG. 2, a nut and bolt arrangement 52 extends between the sub-base depression 48 and a plate 51 received within the chamber 46 to secure the upper end of fluid spring 44 to the sub-base. The lower end of fluid spring 44 is secured in a similar manner to a plate 54 carried by a bracket 56 on the lower base 20. Bracket 56 also supports a fitting 58, FIG. 1, that feeds pressurized fluid to the fluid spring from a conduit 60 whose flow is controlled by a time delay valve 62. A bracket 64 is secured to the web 30 of the upwardly extending base portion 26 by bolts 66 and mounts the time delay valve 62 between the two pairs of spaced links 34. A conduit 68 has a fitting 70 that is attachable to a suitable source of pressurized fluid so as to feed pressurized fluid to the valve. The level of pressurized fluid the valve 62 normally transmits to the fluid spring 44 is governed by a control linkage 72. The control linkage 72, which will be described later in more detail, is adjustable to increase or decrease the pressure of fluid within the fluid spring 44 so as to control the vertical position at which the fluid spring positions the upper base 22. The time delay valve 62 feeds pressurized fluid to the fluid spring 44 when the control linkage 72 indicates that the upper base 22 is at a lower height than the height that corresponds to the position to which the control linkage has been adjusted. The time delay valve 62 also exhausts pressurized fluid from the fluid spring 44 to the environment when the adjusted control linkage 72 indicates that the upper base 22 is higher than the height that corresponds to the adjusted control linkage position. Since the pressurized fluid utilized is sometimes exhausted to the environment, it is preferable to utilize pressurized air; however, other pressurized gases and even suitable liquids may be used with the fluid support system by recycling the fluid that is chosen.

The control linkage 72 thus senses the vertical height of the upper base 22 and through the valve 62 controls this height by either supplying pressurized fluid to the fluid spring 44 or exhausting pressurized fluid from the fluid spring. The static vertical seat position for any adjusted position of the control linkage is thus constant regardless of the weight of the seat occupant. However, when the upper base 22 moves vertically due to dynamic forces present during vehicle use, the time delay operation of valve 62 prevents the control linkage 72 from transiently supplying and exhausting the fluid within the spring 44 as the seat moves above and below its adjusted vertical position. The fluid spring 44 also isolates a seat occupant from vertical vehicle vibrations during vehicle operation by the cushioning effect is provides.

With reference to FIGS. 1, 2 and 3, the sub-base 50 which is supported on the upper end of fluid spring 44 has a generally rectangular configuration that is elongated in a forward and rearward direction with respect to the seat. At the sides of the sub-base 50, a pair of downwardly depending triangular flanges 73, FIG. 1, cooperate with a downwardly depending rear end flange 73' to secure the upper end of the downwardly depending base portion 36 by any suitable means such as welding. A pair of shafts 74 are rotatably supported on the forward and rearward ends of sub-base 50 by journals 76 that are bolted to the sub-base by nut and bolt arrangements 78. Each shaft 74 supports the upper ends of a pair of suspension links 80 that depend downwardly therefrom on opposite sides of the fluid spring 44, as seen in FIG. 2. A pair of spaced side rails 82 of base 22 have L-shaped cross-sections and include downward extensions 84 that are supported on the lower ends of suspension links 80 by bushed nut and bolt arrangements 86. The forward and rearward ends of side rails 82 are connected to each other by end members 88 that extend laterally with respect to the seat, as seen in FIG. 3, and are secured to the side rails in any suitable manner such as by welding.

The suspension links 80 mount the side rails 82 for oscillating movement in a forward and rearward direction. The oscillating member takes place about an equilibrium position where the suspension links 80 depend downwardly in a vertical orientation, as seen in FIG. 1. The seat cushion and back are supported by the base side rails 82 whose oscillation isolates a seated occupant from horizontal vehicle vibrations in a longitudinal direction with respect to the vehicle. As the seat moves forwardly and rearwardly with respect to the floor 12, the suspension links 80 pivot forwardly and rearwardly about their upper ends on the shafts 74 supported by the sub-base 50 on top of fluid spring 44. The force of gravity provides a bias that tends to return the seat to its equilibrium position where the links 80 depend downwardly in their vertical orientation. The extent of forward and rearward seat travel as the oscillation takes place does not have to be large (distances less than two inches will suffice) in order to provide comfort to a seat occupant during extended periods of vehicle travel.

When the occupant of seat 10 is the vehicle driver and must perform some maneuvering operation such as parking or backing up, it is desirable to eliminate the oscillating seat movement so the driver has a secure support from which he can manipulate the vehicle controls. A latch mechanism indicated by reference numeral 90 in FIG. 3 is selectively operable to hold the seat against its oscillating movement. A latch member 92 of the latch mechanism is supported on a plate 94 that extends between the upper side rails 82 and is secured thereto by welds 96. The latch member 92 is supported on plate 94 by a pin 98 for pivotal movement about a lateral axis between the solid and phantom line indicated latching and nonlatching positions shown by FIG. 3. Latch member 92 has a plate-like construction whose plane is located in a horizontal orientation and defines an opening 100.

A keeper 102 of latch mechanism 90 is fixedly mounted on the upper side of sub-base 50 extending upwardly therefrom so as to be received within the opening 100 of the latch member. The keeper 102 has a round cross-section and is received within an open ended keeper slot 104 of latch member opening 100 when the latch member is in its solid line latching position. The keeper slot 104 has a slightly smaller width at its closed end than at its open end so that the forwardly and rearwardly facing latch surfaces of the keeper are respectively engaged with the opposed rearwardly and forwardly facing latch surfaces of the slot in a manner that provides rattle-free latching of the seat against its oscillating movement. An overcenter spring 106 has one end 108 hooked to a flange 110 of the latch mechanism support plate 94 and has another end 112 hooked to an attachment flange 114 on the latch member. Spring 106 tends to bias the latch member 92 counterclockwise when it is located in the latching position and thus tends to engage the forwardly and rearwardly facing latch surfaces of keeper slot 104 with those of the keeper 102.

An operator handle 116 of latch mechanism 90 is operable to move the latch member 92 from its latching position to its nonlatching portion where the keeper 102 is received within the larger portion of latch member opening 100 so that the oscillating seat movement can take place. The spring 106 moves over the center of pin 98 as the latch member 92 is moved to its nonlatching position and biases the latch member 92 clockwise about pin 98 into engagement with a stop 118 on the support plate 94. The operator handle 116 is fixedly secured to a flanged member 120 that is pivotally supported on the support plate 94 by a pin 122. A knob 124 on the outer end of the handle is manually grasped to move the handle about a vertical support axis of pin 122 and a downwardly extending inner end 126 of the handle is received within an elongated slot 128 in the latch member to provide the latch member movement as the handle is rotated. The inner end 126 of the handle slides longitudinally within the latch member slot 128 as it is moved about pin 122 to move the latch member between its latching and nonlatching positions. As the handle 116 is rotated to move the latch member to its nonlatching position, the stop 118 is engaged before the keeper 102 engages the counterclockwise edge of the latch member opening 100 so that there is no friction generated when the seat oscillates forwardly and rearwardly. The handle 116 extends in an outward direction from the latch member 92 and, as seen in FIG. 4, passes through an opening 132 in the downwardly extending flange 84 of its adjacent side rail 82 of the upper base 22. Arcuate stop surfaces 119 of the large portion of latch member opening 100 are generated about the axis of latch member movement at pin 98 and engage the keeper 102 in the nonlatching position to limit the degree of oscillating seat movement.

With reference to FIG. 1, the control linkage 72 extending between upper base 22 and time delay valve 62 is moved not only by the dynamic vertical movement of the upper base but by its oscillating movement as well. The control linkage 72 includes an enlongated valve actuating link 134 with one end connected to the valve 62 and another end pivoted by a pin 138 to the lower end of a vertically extending connecting link 136. The upper end of connecting link 136 is pivoted by a pin 140 to an adjustment link 142 best seen in FIG. 4. The adjustment link 142 is pivotally mounted by a headed pin 144 on the downwardly extending flange 84 of the adjacent upper base side rail 82. A shaft 146 of pin 144 is secured to the adjacent flange 84, such as by welding, and is received within a slightly elongated slot 148 in the link 142 to rotatably support this link. Pin shaft 146 also rotatably supports a spring attachment plate 150 having an attachment flange 152. A helical spring 154 has one end 156 secured to the flange 152 of plate 150 and has another end 158 hooked over the inner end of an operator handle 160 fixedly secured to the end of adjustment link 142 opposite the pin 140. The outer end of handle 160 supports a knob 162 that is manually grasped and moved by a seat occupant to provide adjustment of control linkage 72. An intermediate portion of handle 160 is received within an arcuate slot 164 in the side rail flange 184 of upper base 22. Slot 164 is generated about the pin shaft 146 and has an arcuate surface 166 that is frictionally engaged by the handle 160 due to the bias of spring 154. The frictional engagement is sufficiently large to prevent movement of the handle within the slot except by operator actuation. The slot 148 in the connecting link permits this link to shift bodily to ensure the frictional engagement between the handle and the slot, thereby maintaining the control linkage in any adjusted position in which it is manually moved.

The control linkage 72 has a somewhat U-shaped configuration that opens in a horizontal manner forwardly with respect to the seat. The linkage configuration positions the adjustment link handle 160 in an accessible location for a seat occupant.

With reference to FIG. 1, the time delay valve 62 is controlled by pivotal movement of link 134 from an equilibrium position 0 toward either supply or exhaust positions S or E, respectively. If an occupant of seat 10 desires the seat to be moved to a higher position, he grasps the handle knob 162 and moves the handle upwardly so that the adjustment link 142 pivots clockwise about pin shaft 146 and moves the connecting link 136 downwardly in a manner that pivots the valve actuating link 134 clockwise to its supply position S. After a predetermined time delay period of valve 62 passes, the valve begins to supply pressurized fluid to the fluid spring 44 to raise the seat. As the seat is raised, the upward movement of the pin shaft 146 carries the adjustment link 142 upwardly and causes the connecting link 136 to pull upwardly on link 134 so that it moves back toward its equilibrium position O. When the actuating link 134 has returned to its equilibrium position, the valve 62 terminates its supply of fluid pressure to the fluid spring 44 which then maintains the seat at a vertical height corresponding to the adjusted position of the control linkage. If the seat occupant desires to lower the seat, he grasps the knob 162 and moves it downwardly so that the adjustment 142 pulls up on connecting link 136 and pivots the actuating link 134 counterclockwise toward its exhaust position E. After the predetermined time delay period of valve 62 passes, the valve begins to exhaust the pressurized fluid within the fluid spring 144 so that the seat moves downwardly. The pin shaft 146 carries the adjustment link 142 downwardly as the pressurized fluid is being exhausted from the fluid spring and thereby moves the connecting link 136 downwardly so that the actuating link 134 moves in a clockwise direction toward its equilibrium position 0. Upon reaching the equilibrium position, the actuating link 134 terminates its exhaustion of pressurized fluid within the fluid spring and the seat then remains at a vertical height corresponding to the adjusted position of the control linkage.

The fluid spring 44 isolates a seat occupant from vertical vehicle vibrations as a result of the dynamic action that takes place during vehicle operation. The time delay operation of valve 62 prevents the dynamic upward and downward seat movement that takes place from causing control linkage 72 to transiently actuate the valve in either its supply or exhaust mode. Also, the oscillating forward and rearward movement of the seat that isolates the seat occupant from horizontal vibrations likewise cannot actuate the valve through the control linkage due to the time delay operation of the valve. Valves like valve 62 which are actuated for time delayed supply and exhaust operation by actuating movement in opposite directions are known per se, and no detailed description thereof is necessary. One such valve that functions in this manner is disclosed by the U.S. Pat. No. of Pribonic 2,957,704. Also, it has been found that the frequencies of dynamic seat movement in heavy trucks is usually no lower than 2 cycles per second, i.e. the longest time period is 0.5 seconds per cycle. The valve actuating link 134 is above the equilibrium position during half of the cycle and below it the other half, and a time delay period of 0.25 seconds (one half the time period of the longest cycle) is thus long enough to prevent any transient actuation of the valve due to the dynamic seat movement. However, using an extra long time delay period of no less than 0.75 seconds ensures the prevention of transient valve actuation while still giving quick response of the seat in its adjusting mode of movement. In fact, the delay period can be as long as 2 seconds while still maintaining sufficiently fast adjusting response.

With reference to FIG. 1, the pin 42 that pivotally supports the rearward ends of the lower links 34 has one end of a link 172 fixedly mounted to it in any suitable manner between the spaced flanges 38 of the downwardly extending base portion 36. The other end of link 172 is secured by a pin 174 to the lower end of a shock absorber 176. The upper end of shock absorber 176 is secured by a pin 178 to a flange 180 mounted on the lower side of sub-base 50 between its downwardly extending triangular flanges 73. Extension and retraction of shock absorber 176 provides a damping restraint to the dynamic vertical movement of the sub-base 50. However, the shock absorber 176 permits the adjustment of control linkage 72 to move the sub-base vertically to any of its adjusted positions without affecting the position to which it moves.

With reference to FIG. 2, the side rails 82 of upper base 22 have a pair of adjuster assemblies 182 mounted on their upper sides. The adjuster assemblies are elongated and extend along the longitudinal length of the vehicle to permit forward and rearward adjusting movement of the seat cushion 16 and the seat back 14 with respect to the vehicle controls. Each adjuster assembly includes a lower track 184 supporting an upper track 186 by rollers 188 and balls 190. The rollers 188 carry the vertical loads between the upper and lower tracks and the balls 190 carry side loads. A handle 192 carries a knob 194 that is manually grasped and moved to control an unshown latch mechanism for the adjuster assemblies. The latch mechanism is of a conventional type that permits longitudinal adjusting movement of the seat cushion and seat back while in a nonlatching position and which prevents such movement while in a latching position. A pair of forward and rearward cross members 198, see also FIG. 7, extend between the upper tracks 186 at their forward and rearward ends and support a pair of longitudinally extending support rails 200 associated with opposite sides of the seat. The rear end of each support rail 200 has an associated support member 202 mounted on it, as seen by the left-hand one shown in FIGS. 6 and 7. Each support member 202 is of an L-shaped configuration with a horizontal leg 204 suitably secured in a fixed manner to the side of its associated support rail and an upwardly extending vertical leg 206. The upper end of support member leg 206 carries a nut and bolt arrangement 208 that provides a pivotal support for a downwardly extending bracket arrangement 210 mounted on the associated side of the seat back 14. A torsion spring 212 is received between the seat back bracket arrangement 210 and the support member leg 206 and has an intermediate portion 214 encircling the nut and bolt arrangement 208. One leg 216 of the torsion spring is received within an aperture 218 in the bracket arrangement and another spring leg 220 is received within an aperture 222 in the support member leg 206. The springs 212 associated with the opposite sides of the seat provide a bias that normally tilts the seat back 14 forwardly about its pivotal support on the nut and bolt arrangements 208 at each side of the seat.

With reference to FIGS. 5 through 8, a recliner mechanism 224 is associated with the left-hand side of the seat and includes a keeper 226 fixedly secured in any suitable manner to the lower end of the seat back bracket arrangement 210. The keeper 226 has a generally plate-like construction and includes a plurality of keeper teeth 228 that are arranged in an arcuate configuration generated about the pivotal seat back support axis provided by the associated nut and bolt arrangement 208. A stop 230 is located at each end of the arcuate configuration of keeper teeth. A pawl 232 of the recliner mechanism extends between the support member 202 and a support plate 234 that is mounted on the support member by a pair of bolts 236 and 238. The bolts 236 and 238 also mount a trim plate 240 that covers the support plate 234. An opening 242 in the support plate has a somewhat U-shaped configuration receiving the U-shaped cross-section of one end of pawl 232. The U-shaped cross-section of the other end of pawl 232 is slidably received by a similar opening 244 in the support member 202 at the juncture of its horizontal and vertical legs 204 and 206. The support plate 234 and support member 202 thus provide support portions that slidably mount the pawl 232 for vertical movement between an upper latching position and a lower nonlatching position. With the pawl 232 in the upper latching position shown in FIGS. 5, 6 and 8, the two upwardly extending legs 246 of the pawl are received between adjacent pairs of keeper teeth 228 to prevent tilting movement of the seat back. Forces applied to the pawl by the seat back are transferred to the support member 202 and the support plate 234 in a balanced manner due to the positioning of the keeper 226 between these two components. Between the pawl legs 246, one of the openings between the keeper teeth 228 is unoccupied so that each pawl leg is positioned by two separate keeper teeth in a manner that provides a strong and durable mechanism.

An actuating member 248 of the recliner mechanism 224 is pivotally supported by bolt 236 and has a manually grasped knob 250 at one end thereof as well as a pair of spaced yoke portions 252 at its other end. The yoke portions 252 are received between the support plate 234 and the support member 202 and define openings 254 that receive the pawl 232 so as to move the pawl vertically between its upper latching position and lower nonlatching position upon pivotal movement of the actuating member. As seen in FIG. 6, a helical spring 256 has a lower end 258 hooked over one of the yoke portions 252 and has an upper end 260 received by the opening 222 in the support member 202 that also receives the torsion spring leg 222. The spring 256 provides a bias that normally positions the actuating member 248 in its FIG. 5 solid line indicated position where the pawl 232 is in its latching position engaging the keeper 226. Upward pivotal movement of the knob 250 to the phantom line position causes the yoke portions 252 to move downwardly and move the pawl to its lower nonlatching position where tilting adjustment movement of the seat back 14 is permitted. The stops 230 of the keeper 226 engage the unlatched pawl 232 to limit the extent of the tilting seat back movement.

With reference to FIG. 2, in addition to the forward and rearward adjusting movement of seat back 14, an adjustable wire support arrangement 262 within the seat back has one lateral end thereof secured by a bracket 264 to one lateral side of the seat and has another end secured by a bracket 266 to the other end of the seat in an adjustable manner controlled by a rotation of a knob 268. Rotation of the knob 268 in one direction moves the bracket 266 to the right so as to provide a more taut condition that gives the seat back a firmer feel. Rotation of the knob 268 in the other direction loosens the wire support arrangement to give the seat back a softer feel.

With reference to FIGS. 1, 5, 7 and 9, an adjustable mounting arrangement 270 secures the seat cushion 16 to the upper support rails 200 at each side of the seat so that forward and rearward adjusting of the seat cushion is permitted while the seat back 14 remains stationary. Each of the forwardly extending legs 204 of the support members 202 at each side of the seat includes a keeper flange 272 that extends laterally outwardly from its associated support rail 200. Three longitudinally spaced slots or openings 274 in each flange 272 open laterally in an outboard direction, and one of the openings receives a downwardly extending latch member 276 mounted on the adjacent lower side of seat cushion 16. As seen by particlar reference to FIG. 9, the latch member 276 extends upwardly through an aperture 278 in a seat cushion frame member 280. The upwardly extending portion of the latch member also extends through an aperture in a latch handle 282 and has flats 284 so that rotation of the handle rotates the latch member about a generally vertical axis. The lower side of the handle 282 carries a rubber washer 286 that is supported by the flange 272 of the associated support member 202. A pin 288 extends through the upper portion of the latch member 276 above the seat cushion frame member 280 to hold the latch member against downward movement. The latch member 276 also has a latching portion 290 that is bent at approximately 45° to the vertical axis of rotation of the latch member.

At each side of the seat the handle 282 moves its associated latch member 276 from the latching position shown in FIGS. 5 and 7 to a nonlatching position where longitudinal adjustment of the seat cushion 16 is permitted. The latch member 276 is rotated approximately 90° in a counterclockwise direction as viewed in FIG. 7 from the latching position to the nonlatching position so as to align the latching portion 290 with the elongated direction of the opening 274 in which it is received. The alignment of the latching portion 290 and the opening 274 on the mounting arrangements at each side of the seat cushion 16 permits upward vertical movement of the seat cushion so that it is free from the rest of the seat. The seat cushion 16 may then be moved longitudinally to align the latch member 276 with one of the other openings 274, and subsequent downward movement of the seat then moves the latch member through that particular opening so that the latch handle 282 may be rotated to move the latching portion 290 out of alignment with the opening in a manner that again secures the seat cushion with respect to the seat but at a different longitudinally adjusted position. This latching rotation provides a camming action between the latch portion 290 and the edge of the opening 274. The camming compresses washer 286, the washer having a normal thickness about twice that shown, so that the washer compression maintains the latch member 276 in its latching position.

With reference to FIGS. 1 and 2, the mounting arrangement 270 for the seat cushion 16 also includes a tilt adjuster 292 for controlling the vertical height of the forward end of the seat cushion. The tilt adjuster includes a laterally extending shaft 294 that is rotatably supported by a pair of journals 296 on the lower side of seat cushion 16. A pair of cams 298 are fixed on the opposite ends of shaft 294 inboard of the journals 296 and engage the upper sides of the adjacent support rails 200. A knob 300 rotates the shaft 294 so as to rotate the cams 298 and provide adjustment of the vertical height of the forward end of the seat cushion. Friction between the journals 296 and the shaft 294 maintains the seat cushion 16 in any adjusted position. The titlting seat movement takes place about a laterally extending seat cushion axis that passes through the two latch members 276 at each side of the rear end of the seat. The compressed rubber washers 286 associated with each side of the seat are further compressed to permit the titlting while still supporting the rear end of the seat in a rattle-free manner.

While a preferred embodiment has been described, those skilled in the art will recognize various alternatives which may be used to embody the invention described by the following claims.

What is claimed is:

1. In a vehicle seat adapted to be mounted on a vehicle and including a generally vertical seat back, a seat cushion component having front and rear edges and laterally spaced sides, and a base component, an adjustable arrangement for mounting the seat cushion component on the base component, the mounting arrangement comprising:

a keeper mounted on one of the components and having a plurality of elongated openings spaced along an axis parallel to the seat cushion component sides, the openings extending laterally with respect to said axis;

a latch member mounted on the other component for pivotal movement between latching and nonlatching positions, the latch member including a latching portion that is aligned with the laterally extending orientation of the openings while in the nonlatching position so as to be movable through any one of the openings as the cushion component is positioned on top of the base component, the location of the forward edge of the seat cushion being adjustably determined by the particular opening through which the latch member moves, the latching portion of the latch member moving into an unaligned relationship with respect to the openings upon movement of the latch member to the latching position, the unaligned relationship of the latching portion and the particular opening that receives the latch member maintaining the cushion component on the base component in the associated adjusted position of the cushion component with respect to the seat back, and the latching portion having a component extending along said axis in the latching position to permit tilting movement of the seat cushion component on the base component.

2. A seat according to claim 1 wherein the keeper is mounted on the base component and the latch member is mounted on the seat cushion component.

3. A seat according to claim 2 wherein the keeper is provided by a flange of a support member that pivotally mounts the seat back.

4. A seat according to claim 2 wherein the latch member is encircled by a compressible washer that engages the keeper and compresses during tilting movement of the seat cushion component.

5. A seat according to claim 1 wherein the keeper openings are open ended at their outboard sides.

6. A seat according to claim 1 wherein the latch member pivots about a vertical axis and the latching portion thereof is oriented at about 45° with respect to the vertical.

7. A seat according to claim 1 wherein the mounting arrangement includes a keeper and latch member at each side of the seat.

8. A seat according to claim 1 wherein there are three openings in the keeper.

9. A seat according to claim 1 wherein the latch member is moved between the latching and nonlatching positions by a manually actuated handle.

10. A seat according to claim 1 wherein the latch member moves approximately 90° between the latching and nonlatching positions.

11. A seat according to claim 1 wherein the keeper and latch member are located adjacent the rear edge of the seat cushion component.

12. In a vehicle seat adapted to be mounted on a vehicle and including a generally vertical seat back, a seat cushion component having front and rear edges and laterally spaced sides and a base component, an adjustable arrangement for mounting the seat cushion component on the base component, the mounting arrangement comprising:

- a keeper mounted on the base component and having a plurality of elongated openings spaced along a horizontal axis parallel to the seat cushion component sides, the openings extending laterally with respect to said axis;
- a latch member mounted on the seat cushion component for pivotal movement about a vertical axis between latching and nonlatching positions, the latch member including a latching portion that is aligned with the laterally extending orientation of the openings while in the nonlatching position so as to be movable through any one of the openings as the cushion component is positioned on top of the base component, the location of the forward edge of the seat cushion being adjustably determined by the particular opening through which the latch member moves, the latching portion of the latch member moving into an unaligned relationship with respect to the openings upon movement of the latch member to the latching position, the unaligned relationship of the latching portion and the particular opening that receives the latch member maintaining the cushion component on the base component in the associated adjusted position of the cushion component with respect to the seat back, and the latching portion having a component extending along said horizontal axis in the latching position to permit tilting movement of the seat cushion component; and
- a handle for moving the latch member between the latching and unlatching positions.

13. A seat as in claim 12 further including a tilt adjuster for tilting the seat cushion component on the base component.

14. A seat as in claim 13 wherein the tilt adjuster includes a pair of cams located between and engaged with the seat cushion and base components, a shaft fixedly connected to the cams, and a handle for rotating the shaft and hence the cams to tilt the seat cushion component on the base component about the latch member.

* * * * *

UNITED STATES PATENT OFFICE
CERTIFICATE OF CORRECTION

Patent No. 4,054,318　　　　　　　　Dated October 18, 1977

Inventor(s) Robert W. Costin

It is certified that error appears in the above-identified patent and that said Letters Patent are hereby corrected as shown below:

Column 2, line 28 "an" should be --on--.
Column 3, line 4 "the vertical" second instance, should be --vehicle--.
Column 4, line 28 "12" should be --22--.
Column 4, line 50 "flanges" should be --fluid spring--.
Column 5, line 34, "is" should be --it--.
Column 5, line 62 "member" should be --movement--.
Column 6, line 21 after "upper" insert --base--.
Column 6, line 24 "lateral" should be --vertical--.
Column 6, line 53 "portion" should be --position--.
Column 10, line 37 "222" should be --220--.
Column 11, line 5 "particlar" should be --particular--.

Signed and Sealed this

Thirty-first Day of January 1978

[SEAL]

Attest:

RUTH C. MASON　　　　　　　　LUTRELLE F. PARKER
Attesting Officer　　　　　　Acting Commissioner of Patents and Trademarks